UNITED STATES PATENT OFFICE.

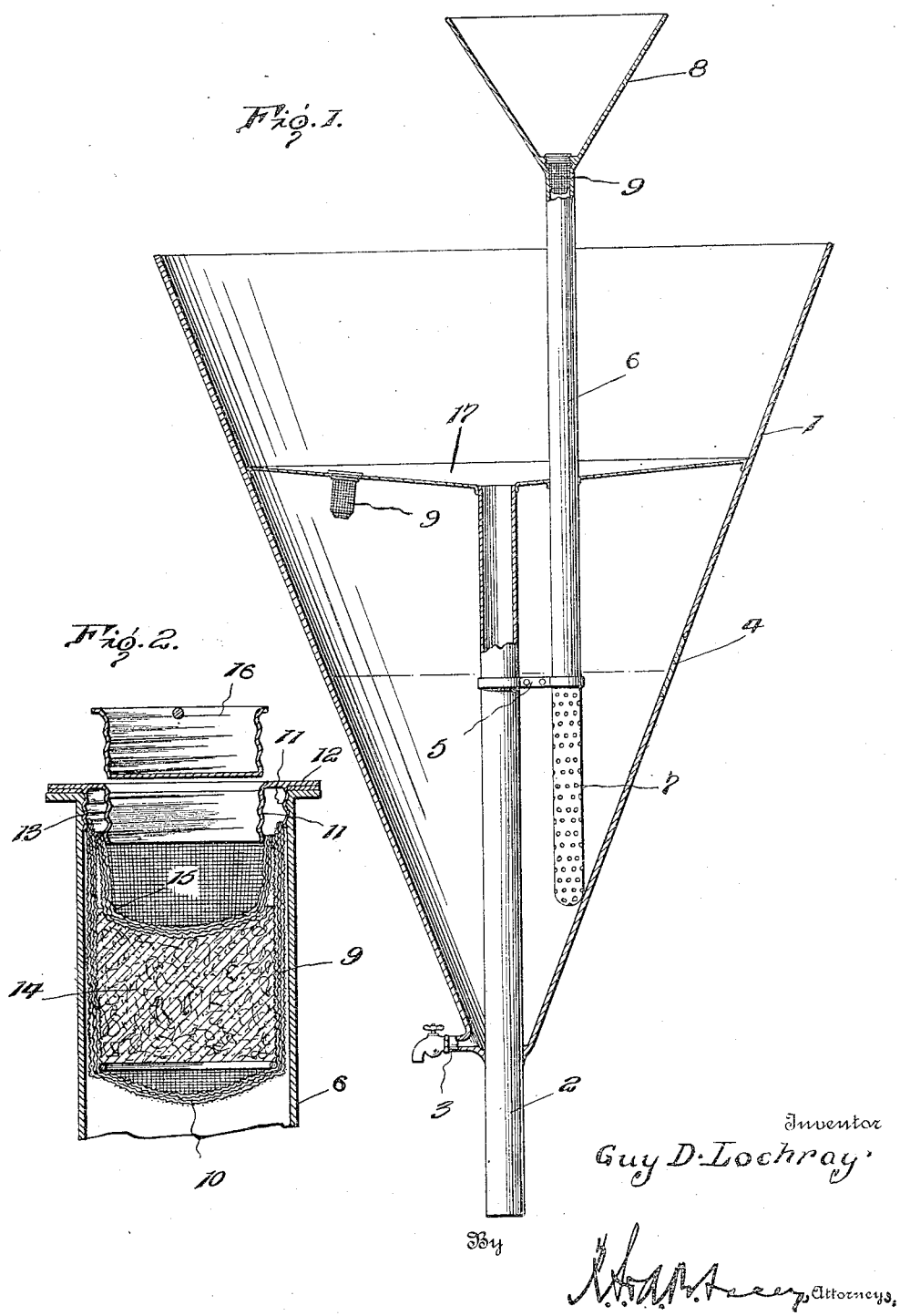

GUY D. LOCHRAY, OF FORT DODGE, IOWA, ASSIGNOR OF ONE-HALF TO A. P. MORREY, OF FORT DODGE, IOWA.

GASOLENE-FILTER.

1,210,380.     Specification of Letters Patent.     Patented Dec. 26, 1916.

Application filed June 22, 1916. Serial No. 105,223.

*To all whom it may concern:*

Be it known that I, GUY D. LOCHRAY, a citizen of the United States, residing at Fort Dodge, in the county of Webster and State of Iowa, have invented certain new and useful Improvements in Gasolene-Filters, of which the following is a specification.

This invention relates to means for separating gasolene from water and eliminating all dirt, sand, or other foreign matter which may be contained in the fluid so that the gasolene vapor supplied to an internal combustion engine will be free of impurities and the deposit of carbon now ordinarily attendant upon the use of such motors will be overcome.

The invention seeks to provide a device of simple and inexpensive construction which may be readily fitted to the intake opening of any gasolene tank and operate efficiently to clean and filter the gasolene as the same is fed into the tank.

The invention also seeks to provide a device which may be easily and rapidly cleaned after use.

The invention is illustrated in the accompanying drawings and consists in certain novel features which will be particularly pointed out in the claims following a detailed description.

In the drawings, Figure 1 is a view partly in vertical section and partly in elevation of a device embodying my present invention; Fig. 2 is an enlarged detail section of the filtering structure.

In carrying out my invention, I employ a large funnel-shaped body or receptacle 1 from the lower end of which extends a pipe 2 which is adapted to engage the intake or feed opening of a gasolene tank so that the fluid flowing through said pipe will be fed directly into the tank. This pipe 2 extends upwardly within the body 1 for a considerable distance, as shown, and in the lower end of the body is a faucet or other outlet 3 to drain off the water and sediment as the water may collect within the body, as will be presently more particularly set forth. At a convenient point on the side of the body is a gage tube or sight glass 4 which will be so located that when the water level is visible through the glass that fact will indicate that the device should be drained. Disposed within the body 1 and supported by a bracket 5 extending laterally from the pipe 2 is an inlet tube 6 having its lower end perforated, as shown at 7, and having its upper end projected above the open upper end of the body and equipped with a funnel 8. The several parts should be so disposed that the perforations 7 will all be below the bracket 5.

In the upper end of the inlet pipe 6, at the junction of the funnel 8 therewith, I secure a filter consisting of a cylindrical body 9 constructed of fine mesh wire netting, the lower end of the said cylindrical body being closed by a cap 10 of the same material and the upper end of the body being secured between concentric threaded rings 11 having their upper edges united in an outturned annular flange 12 which is adapted to rest upon the upper end of the pipe 6 or upon the inner surface of the funnel 8 immediately over the upper end of the pipe. The outer threaded ring 11 is adapted to engage a threaded portion 13 of the pipe or tube in which the filter is fitted so that the filter may be readily secured in place or withdrawn when it is necessary to repair or clean the same.

Within the cylinder 9, I provide a filtering medium which will preferably consist of a body 14 of felt or similar material and this filtering medium is held in the lower end of the cylinder 9 by an upper thimble or cup 15 of fine mesh wire netting, the said cup or thimble being secured to and between the rings 11, as shown clearly in Fig. 2. I preferably employ several plies or layers of wire netting so that the filtering action will be multiplied and enhanced. A closure in the form of a screw cap 16 is provided for each filtering member and is adapted to screw into the inner ring 11 so as to close the same and prevent the entrance of dirt when the device is not in use.

A disk or partition 17 is secured rigidly within the funnel body 1 and fits closely around the inlet and outlet pipes, being dished toward its center where it is flush with the upper end of the outlet pipes so as to direct the fluid thereinto. A filter, corresponding in every respect to the filter in the upper end of the inlet pipe 6, is secured in and depends from the disk at an eccentric point of the same as shown in Fig. 1.

It is thought the manner of using the device will be readily understood. The outlet 3 is closed and the screw caps 16 removed. The body 1 is then set in the intake opening of the gasolene tank and the gasolene is poured into the funnel 8 from which it will pass through the thimble or cup 15 and the filtering medium 14 and escape through the lower end 10 of the cylinder 9 into the pipe 6. It will be permitted to flow slowly from the pipe 6 through the perforations 7 and will collect in the lower end of the funnel-shaped body 1. The dirt, grime, and other foreign particles will be largely caught and collected in the cup or thimble 15 and a further cleansing action will be effected in the lower end of the pipe 6 by reason of the perforated construction of the same so that the fluid passing through the perforations will consist of water and nearly clean gasolene. The water and gasolene will naturally separate within the funnel-shaped body 1, the water collecting in the bottom of said body and the gasolene rising to and floating on the surface of the water. As the water collects in the body 1, the level of the same will, of course, rise and the oil will be forced to a higher level in the body and will pass through the filter depending from the disk 17 and then flow over said disk to the escape pipe 2. Should the water line approach too closely to the disk 17 or the upper end of the outlet pipe 2, the feeding of the gasolene will be suspended and the outlet 3 opened. The water and dirt will, consequently, be permitted to drain from the funnel-shaped body 1 until the water line has been brought down to the lower end of the sight tube or below the same, whereupon the outlet 3 may be closed and the feeding of the gasolene resumed.

It will be readily noted that my device is exceedingly simple in construction and may be manufactured at a very low cost. It will be direct and efficient in operation and may be easily cleansed or repaired when necessary. It will be noted that the fluid is caused to twice pass through a filtering medium before reaching the outlet besides being retarded in its flow and caused to ascend in order to reach the outlet so that the gasolene which finally reaches the engine will be free of foreign particles which may tend to interfere with the thorough vaporization of the gasolene or the proper operation of the engine. The disk 17 prevents loss of gasolene by splashing, and a cover may be placed over the upper end of the body 1 to prevent dust settling on the disk.

Having thus described my invention, what I claim as new is:

1. A device for the purpose set forth comprising an inverted conical body, a dished partition extending across the same near the upper end thereof, an inlet pipe passing through said partition and terminating near the lower end of the body, a filter in the upper end of said inlet pipe, an outlet pipe leading from the partition through the lower end of the body, a filter depending from said partition, a support for the inlet pipe projecting from the outlet pipe, and a drain leading from the lower end of the body.

2. In a device for the purpose set forth, the combination of a pipe through which fluid to be filtered is caused to flow, of a reticulated cylinder removably secured in the upper end of said pipe, a filtering medium within said reticulated cylinder, a reticulated cup fitted in the upper end of said cylinder and bearing upon said filtering medium, and a closure for the upper end of said cup.

3. In a device for the purpose set forth, the combination with a tube through which the fluid to be filtered is caused to flow, of a ring adapted to be screwed into the upper end of said tube, a reticulated cylinder having its upper end secured to said ring, a reticulated closure for the lower end of said cylinder, a filtering medium within said cylinder, a reticulated cup bearing upon the said filtering medium, and a second ring secured within the first-mentioned ring and securing said cup.

In testimony whereof I affix my signature.

GUY D. LOCHRAY. [L. S.]

Copies of this patent may be obtained for five cents each, by addressing the "Commissioner of Patents, Washington, D. C."